Figure 1:
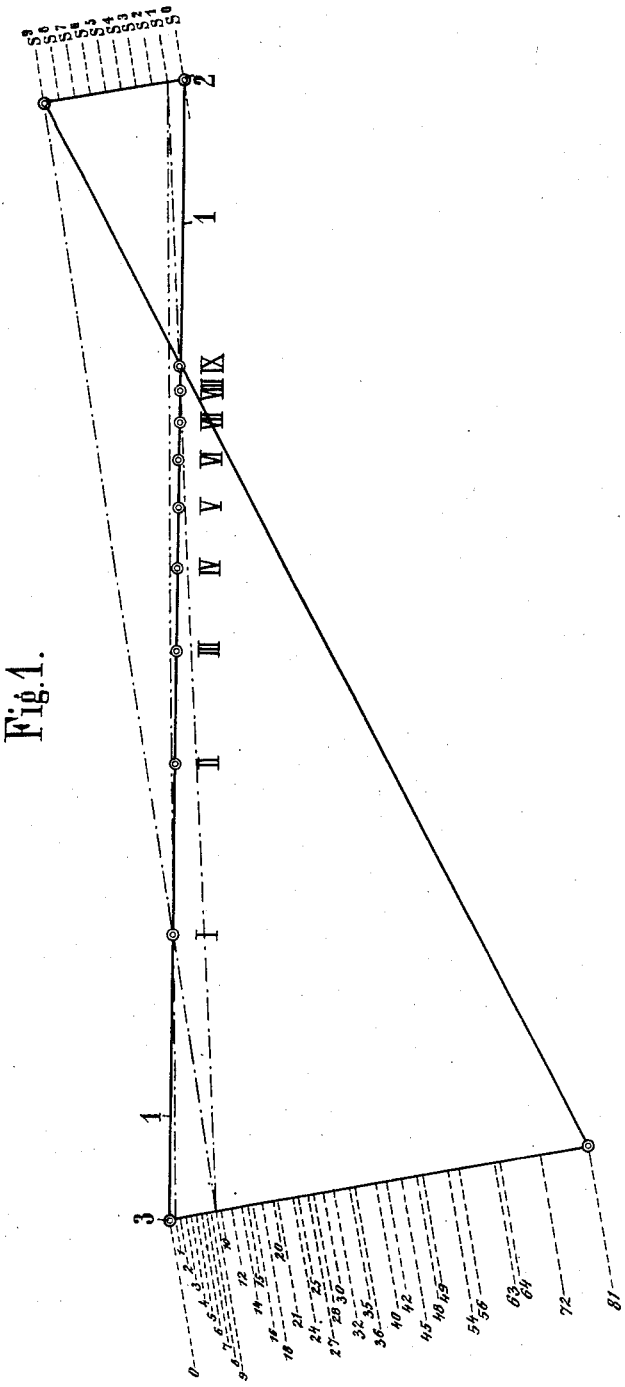

R. REIN.
CALCULATING MACHINE.
APPLICATION FILED MAR. 27, 1911.

1,028,135.

Patented June 4, 1912.
8 SHEETS—SHEET 1.

Witnesses:
C. M. Sweeney
Fred A. Klinge

Inventor:
Robert Rein.
By Calvin Calvert, attys.

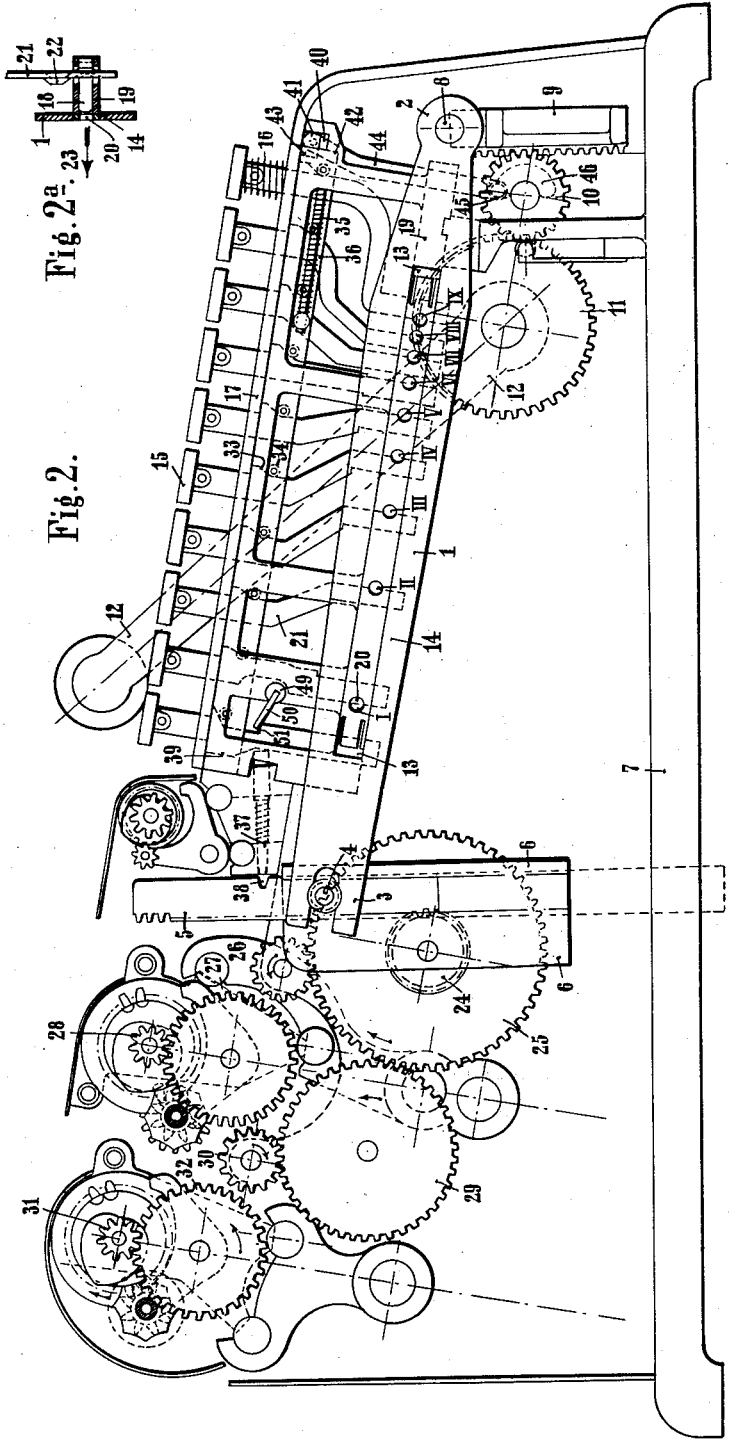

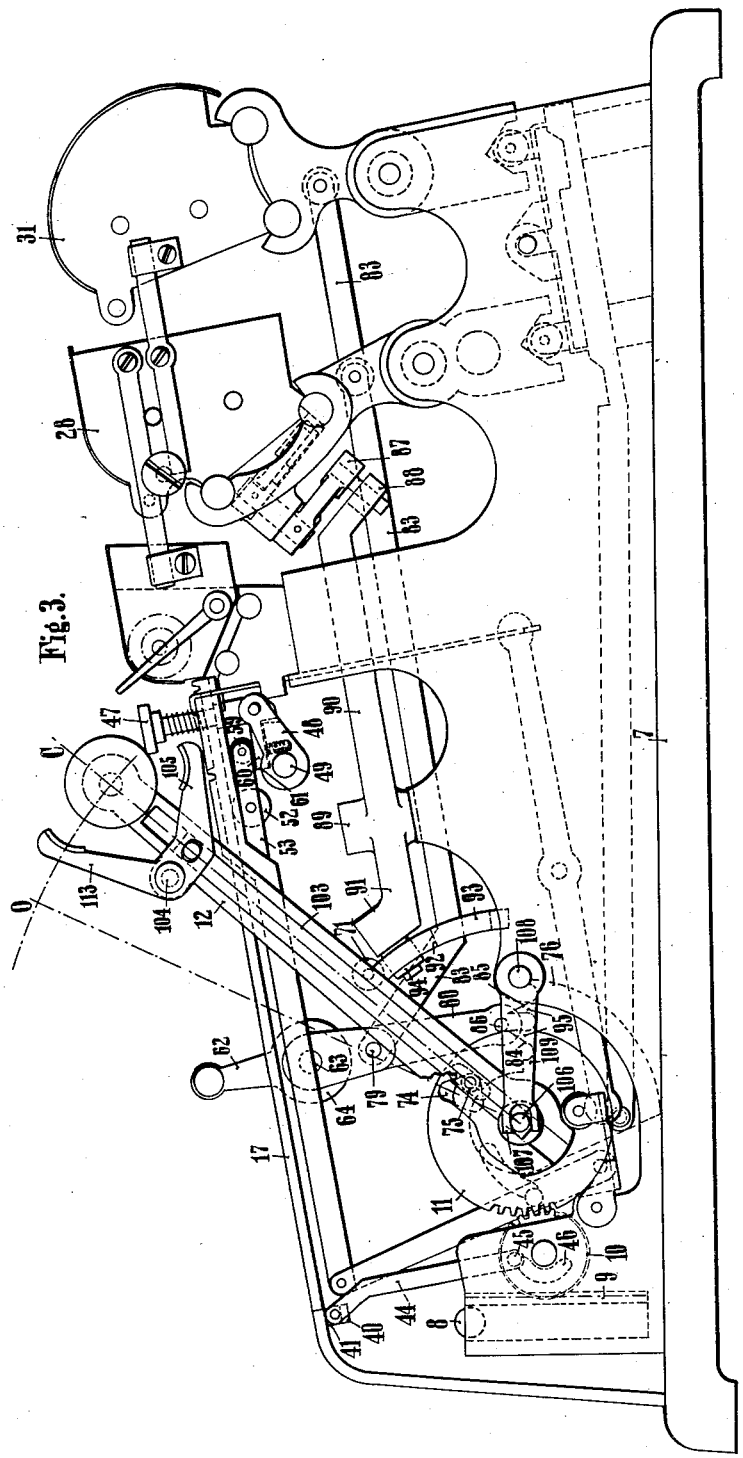

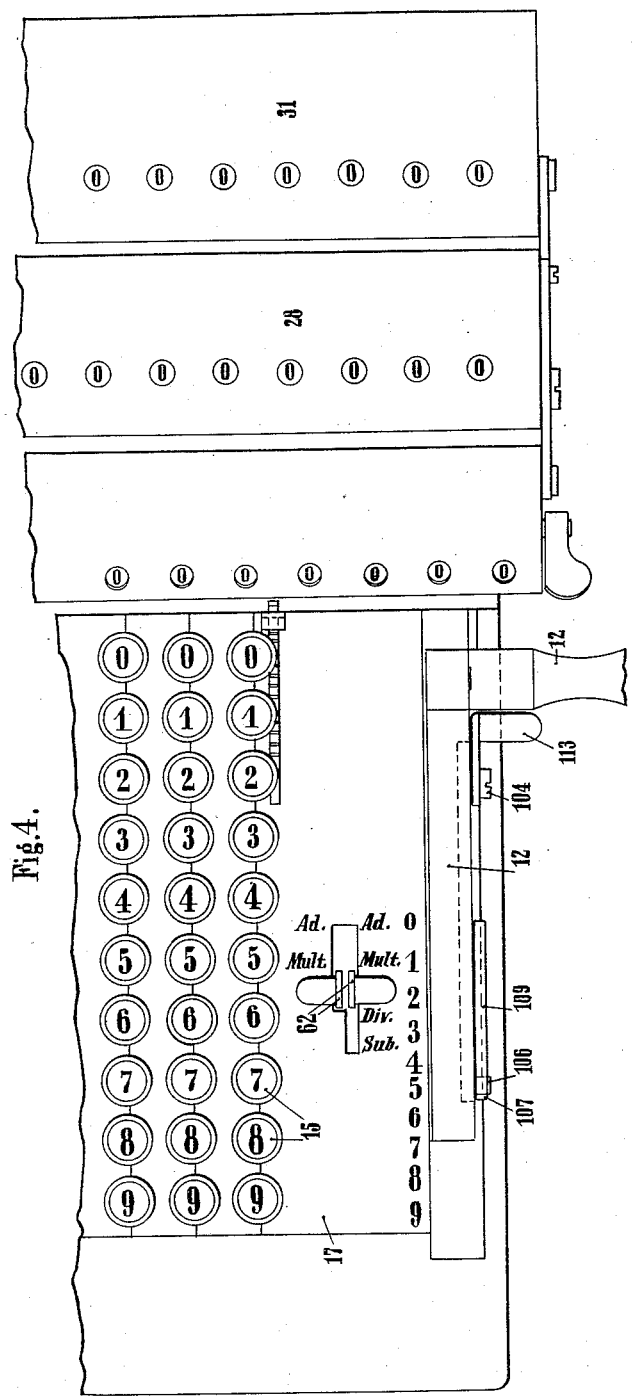

R. REIN.
CALCULATING MACHINE.
APPLICATION FILED MAR. 27, 1911.
1,028,135.
Patented June 4, 1912.
8 SHEETS—SHEET 5.
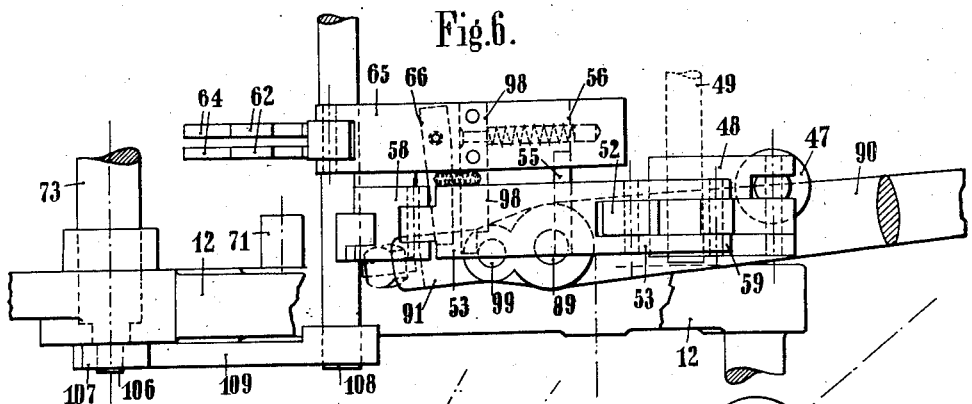
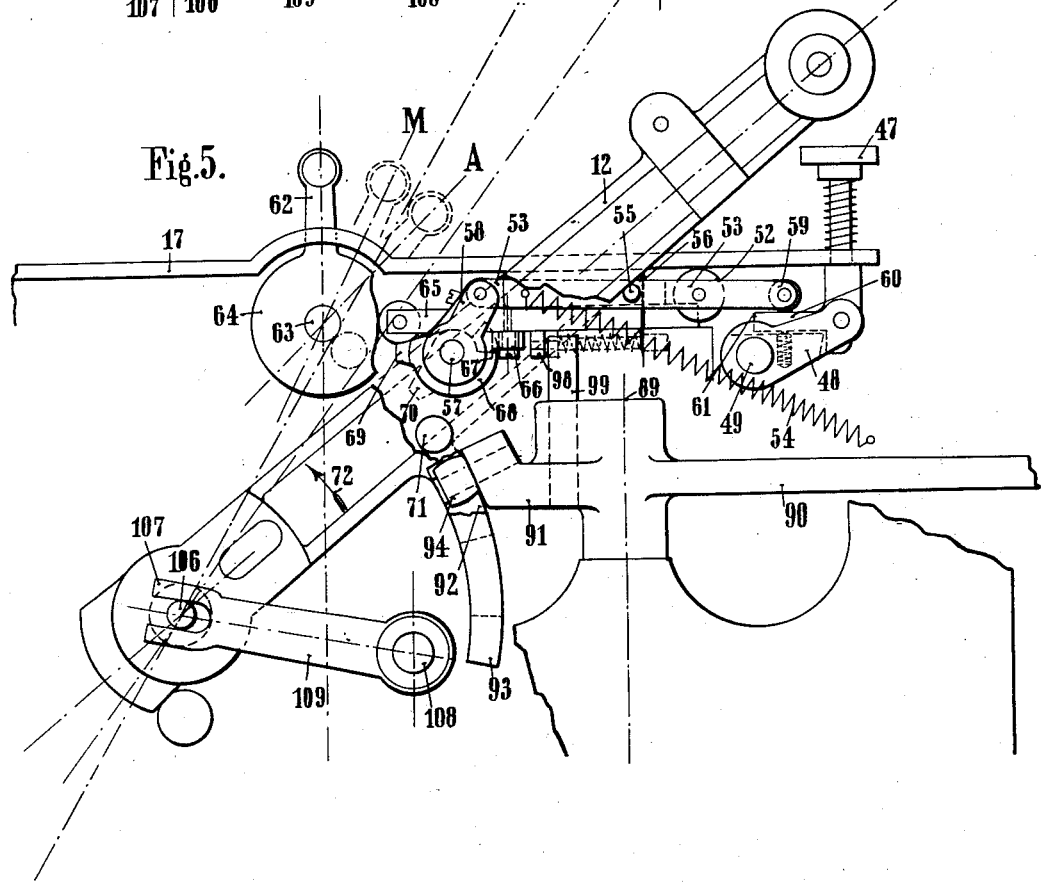
Witnesses:
C. M. Sweeney
Fred A. Klinge
Inventor:
Robert Rein
By Calvert Calvert
Attys.

R. REIN.
CALCULATING MACHINE.
APPLICATION FILED MAR. 27, 1911.
1,028,135.
Patented June 4, 1912.
8 SHEETS—SHEET 6.
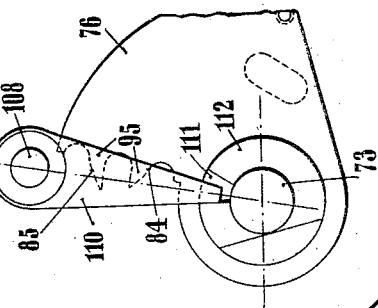
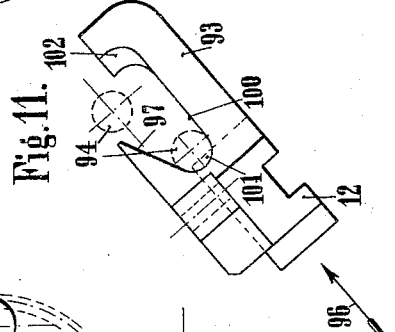
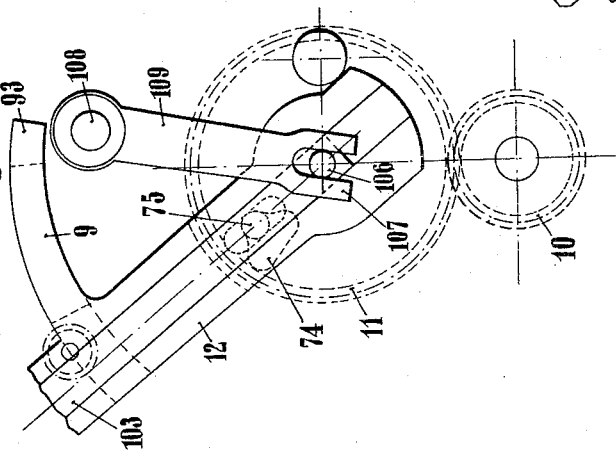
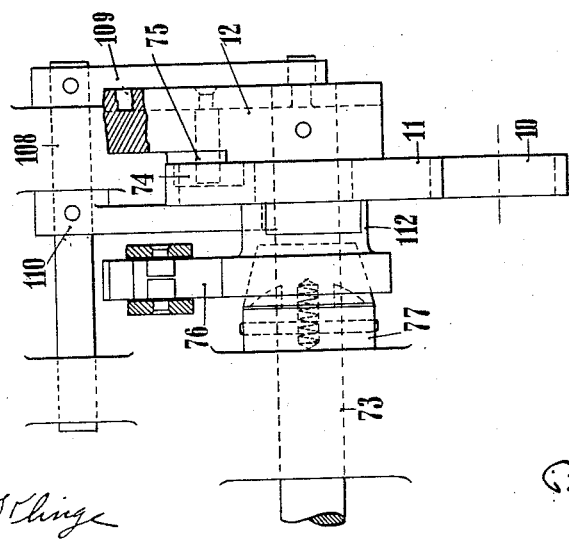
Witnesses:
C M Sweeney
Fred A. Klinge
Inventor
Robert Rein
By Calvin Cabot
atty.

R. REIN.
CALCULATING MACHINE.
APPLICATION FILED MAR. 27, 1911.
1,028,135.
Patented June 4, 1912.
8 SHEETS—SHEET 7.
Fig. 10.
Fig. 9.
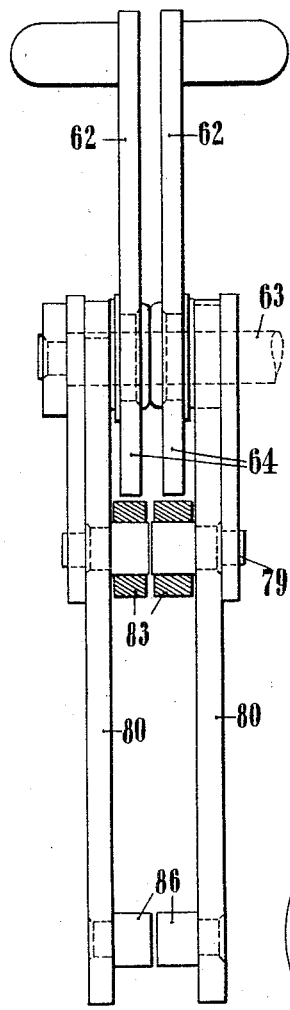
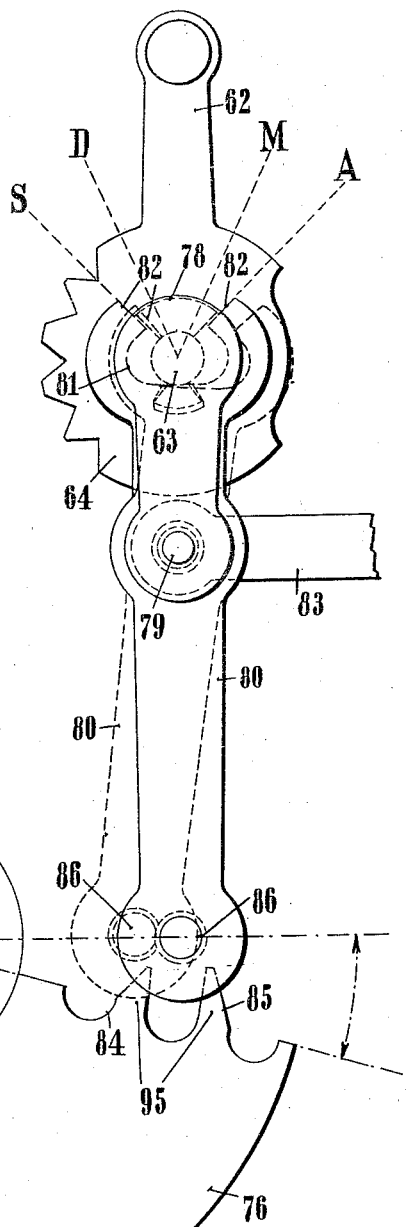
Witnesses:
C. M. Sweeney
Fred A. Klinge
Inventor:
Robert Rein
By Calvin Calvert
Attys.

R. REIN.
CALCULATING MACHINE.
APPLICATION FILED MAR. 27, 1911.
1,028,135.
Patented June 4, 1912.
8 SHEETS—SHEET 8.
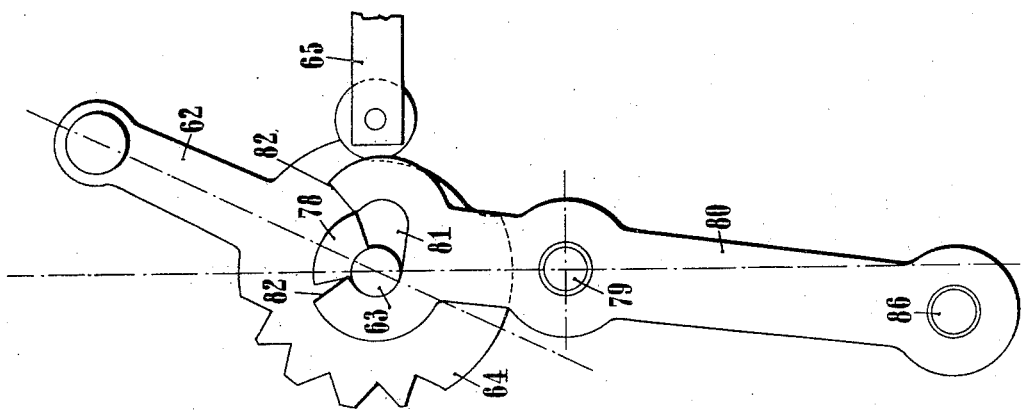
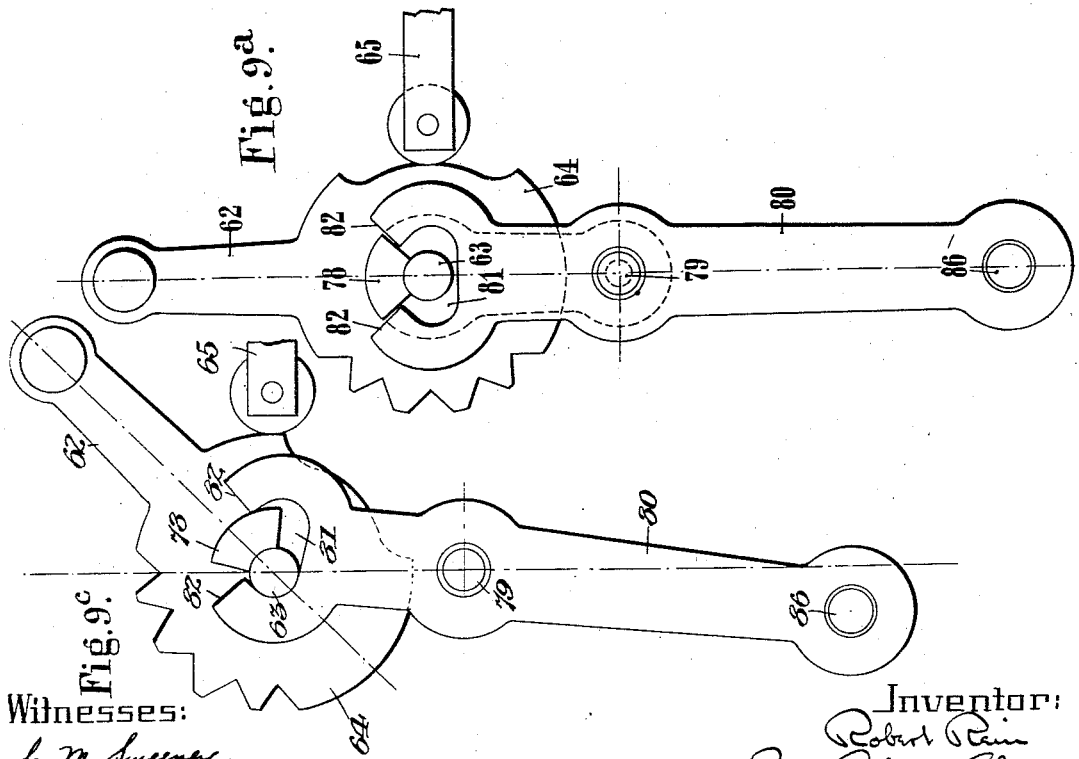
Witnesses:
C. M. Sweeney
Fred A. Klinge
Inventor:
Robert Rein
By Calver Calvert
Attys.

UNITED STATES PATENT OFFICE.

ROBERT REIN, OF BERLIN, GERMANY.

CALCULATING-MACHINE.

1,028,135.  Specification of Letters Patent.  Patented June 4, 1912.

Application filed March 27, 1911. Serial No. 617,126.

*To all whom it may concern:*

Be it known that I, ROBERT REIN, a subject of the German Emperor, and resident of Berlin, Germany, have invented a certain new and useful Improvement in Calculating-Machines, of which the following is a specification.

The machine forming the subject of the present invention belongs to that class of calculating machines in which movement is imparted to toothed gearing proportionately to the product of two single digit numerals by means of adjustable levers, the movement being transmitted directly to a counter-mechanism the counter-wheels of which are connected with each other by decimal transfer gear.

One embodiment of the invention is illustrated in the accompanying drawings by way of example.

Figure 1 is a diagrammatic illustration of the principle of operation of the machine. Fig. 2 is a longitudinal sectional view of the machine showing the means of actuating the levers, the toothed racks connected therewith and the counter mechanism. Fig. 2$^a$ is a detail cross sectional view through one of the levers. Fig. 3 is a longitudinal section through the machine. Fig. 4 is a plan view of a part of the machine. Figs. 5 and 6 are an elevation and a plan view, respectively, of the operating and transferring levers and parts associated therewith. Figs. 7 and 8 are front and side elevations, respectively, of the coupling between the multiplicator lever and the toothed wheels for actuating the levers. Fig. 9 to 9$^c$ are front elevations and Fig. 10 is a side elevation of the devices for bringing into action the counter-mechanism on actuation of the multiplicator lever. Fig. 11 is a detail view of the actuating means for the counter-mechanism. Fig. 12 is a detail view of the devices for throwing the counter mechanism out of operation when the multiplicator lever is in an intermediate position.

Referring to Fig. 1, 1 represents a lever, one end 2 of which may be moved through the distances $s^0$–$s^9$. The lever 1 has nine different fulcrums I–IX which are so arranged that when the lever 1 is turned on the fulcrum IX the amplitude of vibration of the other end 3 is nine times as great as when the fulcrum I is employed and in like manner when the fulcrum V is employed the amplitude of vibration of the end 3 is five times as great as when the fulcrum I is employed, and so on. It is evident that when the end 2 of the lever is moved to the extent $s^1$ and the fulcrum I is employed the end 3 of the lever is moved (corresponding to the ratio of leverage) to the point 1; when however the fulcrum II is employed the end of said lever is moved to the point 2,—when the fulcrum IX is employed, to the point 9; and further that when the end 2 of the lever is moved, for instance, to the point $s^5$ while the fulcrum I is employed the end 3 of the lever is moved through 5 units; when the fulcrum II is employed said end is moved through 10 units; when the fulcrum IX is employed, through 45 units; and so on.

If nine keys be arranged to act upon the fulcrums I–IX in such manner that upon the depression of a key the fulcrum corresponding to the numeral represented by this key is rendered operative and further if a multiplicator lever be so arranged that it may be put into nine different positions thereby bringing the end 2 of the lever 1 into the different positions $s^0$–$s^9$, a multiplication machine for single digit numerals will be produced. By arranging such elementary machines side by side a multiplying machine for figures with a plurality of digits may be obtained. Such a machine can, of course, be also used as an adding machine and by suitable reversing of the counter-mechanism also for subtraction and division. At the same time two counter or registering mechanisms for indicating the results may be arranged one behind the other and actuated by the racks which are operated by the levers so that in complicated calculations of the form $a \times b + c \times d$ $+ e \times f$ the separate result and the total result may be exhibited simultaneously. A printing mechanism for recording the total may be substituted for the rear counter-mechanism.

Fig. 2 of the drawings shows the construction of a machine based upon the principle above outlined. 1 denotes the key levers the rear forked ends 3 of which engage pivots 4 on the racks 5 which are to be moved proportionately to the product of single digit figures. The racks 5 are disposed in guides 6 arranged in the machine frame 7. The front ends 2 of the levers 1 are formed with eyes embracing pins 8 carried by racks 9 arranged within suitable guides secured to the frame or casing 7, the actuation of which racks is effected (corresponding to the distances $s^0$–$s^9$ of the diagram, Fig. 1) by means of toothed wheels 10 and 11 actuated by the multiplicator lever 12. As the ends 2 of the levers 1 are guided in a straight line the fulcrums of the levers must be arranged so as to allow a certain amount of relative sliding movement. This is effected (both for the purpose of reducing friction and for producing sufficient surface of contact) by providing the levers 1 with slots 13 within which are arranged slide blocks 14 having orifices 20 (see Fig. 2ª) adapted to receive pins 18 constituting the fulcrums I–IX. The slide blocks 14 therefore pivot about one or the other of the fulcrum pins serving as the pivotal support for the levers 1 and allow a certain amount of sliding to permit of the rectilinear movement of the ends 2 of the levers.

Above each of the levers 1 is arranged a series of keys 15 representing the numerals 0 to 9, which keys are subjected to the action of springs 16 tending normally to elevate the same and are arranged to slide vertically through the cover 17 of the machine. The key 15 of each set representing the numeral "1" is arranged to control the fulcrum I of the corresponding lever, the key bearing the numeral "2" to control the fulcrum II, and so on by means of the following mechanism. The pins 18 are slidably arranged, adjacent to the orifices 20, within recesses of a bar 19 and are subjected to the action of springs tending normally to withdraw them from the recesses 20. The keys 15 are provided with extensions 21 arranged adjacent the pins 18 and having projections 22 each adapted to force the corresponding pin 18 into the recess 20 in the corresponding slide block 14 in the direction of the arrow 23 on Fig. 2ª, thereby fixing the fulcrum corresponding to the figure represented by the depressed key. The zero keys have no connection with any of the pins 18.

The exact adjustment of the mulitplicator lever 12 for moving the end 2 to the extent of 0–9 units is effected by the aid of a scale provided with corresponding divisions and arranged at the side of the machine (see Fig. 4).

The movement of the racks 5 is communicated to the wheels 24 and 25. The wheel 25 is in mesh with the wheel 26 with which the wheel 27 of the counter mechanism 28 is adapted to be brought into engagement to actuate the counter mechanism in the positive direction, i. e., for addition and multiplication. Further, the wheel 25 engages with the wheel 29 and the latter with a wheel 30, with which the wheel 27 of the counter mechanism 28 is also adapted to be brought in to engagement by reversal of the operation in order to actuate this counter mechanism in the negative direction, i. e., for subtraction and division. The rear counter mechanism 31 can also be actuated from the wheel 30 through the wheel 32 which may be brought into engagement with said wheel 30, actuating the counter only in one direction, (positive direction for addition and multiplication). For the rear counter mechanism a printing device may be substituted. The two registering mechanisms 28 and 31 as entireties are mounted for limited rocking movement about suitable centers, and are so moved to bring them into or out of engagement with the wheels 26 and 30 by means of rods 83 connected with levers 62 hereinafter described.

The keys 15 are each provided with a lug 33, which upon depression of a key engages a pin 34 on a bar 36 slidably arranged in the frame 7 and subjected to the action of a spring 35 in such manner that this bar is at first moved to the right and as soon as the lug 33 has passed the pin 34, again to the left, engaging the upper edge of the lug 33 and thereby retaining the key in its depressed position. If a second key be depressed, this depression causes the bar 36, and consequently the pins 34 carried thereby, to move toward the right so that the previously depressed key is released and raised by the action of its spring 16. It is therefore clear that the depression of a second key of a row of multiplicands causes the release of any previously depressed key.

In order to lock those racks 5 which correspond to depressed zero keys and which should consequently remain stationary, spring actuated pins 37 are arranged in the machine frame and are adapted to engage notches 38 in the racks 5. The front ends of these pins are engaged by lugs 39 on the extensions 21 of the zero keys, which, upon the depression of the keys push the pins 37 forward into engagement with the notches 38 thereby locking the racks 5 so that displacement of these racks is impossible so long as the zero keys are depressed.

As depression of the keys should be permitted only when the multiplicator lever is in its zero position, since in this position only do the orifices 20 of the slide blocks 14 register with the pins in the recesses of the bar 19, it is desirable that the bar should be kept locked at all times except when said multiplicator lever 12 is in its zero position. For this purpose a locking rod 41 which is vertically movable within recesses 40 in the cover is disposed immediately in front of the ends 42 of the bars 36. If this locking rod 41 be lowered so as to lie in front of said ends displacement of said bars is rendered impossible. When, however, the rod 1

41 is in its upper position (corresponding to the zero position of the multiplicator lever) recesses 43 in the bars 36 permit movement of these bars through distances corresponding to the breadth of the lugs 33 of the keys 15. The lowering of the locking rod 41 is effected, upon movement of the multiplicator lever 12, by means of a rod 44 carrying a pin 45 engaging a cam slot 46 in the wheel 10 of a rod 44 carrying a pin 45 engaging a cam slot 46 in the wheel 10.

In order to release the depressed keys simultaneously with the setting of the machine for addition in such manner that only the so-called zero keys are depressed, a common release key 47 is provided (Figs. 3 and 5). The depression of this key actuates a lever 48 which is keyed to a shaft 49 running transversely of the machine. Upon this shaft is fixed a bar 50 engaging recesses 51 in the zero keys (Fig. 2). If the release key 47 is depressed the bar 50 is turned downward thereby engaging recesses 51 in the zero keys whereby the latter are depressed, thus releasing all the other keys.

In setting the machine for addition as hereinafter described, it is desirable that on the return of the multiplicator lever 12 into its initial position all keys should be released without actuating the release key 47, while the zero keys are depressed. For this purpose devices are provided which are actuated by the multiplicator lever only when the machine is set for addition. These devices comprise a member 53 supported by a roller 52 upon a bar in the frame, said member having a projecting pin or lug 55 normally held in engagement with a stop surface 56 on the frame by a spring 54. The member 53 is connected to a lever arm 58 pivoted upon a pin 57, which arm 58 is adapted to move said member out of contact with the edge 56 against the action of the spring 54. The forward end 59 of the member 53 is supported by a roller upon a spring actuated pawl 60 pivoted to the arm 48. As soon as the member 53 is moved by the lever arm 58 far enough for the end 59 to release the pawl 60 the latter is thrown up by the action of its spring. If, thereupon, the arm 53 is moved in the opposite direction by the spring 54 the end 59 of the rod presses against the edge 61 of the pawl 60 and thereby, owing to the eccentric position of said pawl relatively to the shaft 49, depresses the arm 48 turning the shaft 49 and depressing the zero keys, thereby releasing the other depressed keys.

The actuation of the member 53 is effected in the following manner: The levers 62, which, as hereinafter described, serve to set the machine for addition, multiplication, subtraction or division, and which are pivoted in studs 63, are provided with cams 64 which are engaged by a roller carried by a slide 65. When a lever 62 is moved into the dotted position A (for addition) the slide 65 is pushed back by the cam face 64 against the tension of a suitable spring. The slide 65 carries a pawl 66 (Fig. 6) which, in the mid-position or in the position of the multiplication setting, engages the face 67 of a sleeve 68 loosely mounted on the pin 57. In this position the sleeve 68 is so locked that a lug 69 thereon is turned upward (Fig. 5, full line position). When the slide 65 is pushed back by the cam 64, the lever 62 being in the position for adding, the pawl 66 releases the face of the sleeve 68 so that the latter returns under the action of a spring into the position shown in dotted lines 70 in Fig. 5 until the edge 67 thereof engages a suitably disposed stop on the lever 58.

The multiplicator lever 12 carries a roller 71 which, upon the forward movement of said lever in the direction of the arrow 72 on Fig. 5, contacts with the lug 69 when the latter is in the position shown in dotted lines, said roller being allowed to move past said lug owing to the sleeve 68 being free to rotate. In the return movement of the multiplicator lever in the opposite direction to the arrow 72, the roller 71 engages with the lug 69 and imparts a turning movement to the sleeve 68 and lever 58, the stop on said lever abutting against the face 67 of the sleeve, thus moving the slide 53 against the action of the spring 54 and allowing the pawl 61 to rise, whereupon, after the roller 71 has passed the lug 69, the spring 54 causes the return of the slide 53 and the simultaneous rotation of the shaft 49 and release of the depressed keys as above described.

After the setting of the keys the multiplicator lever must be set to the numeral with which it is intended to multiply. Prior to moving the multiplicator lever the counter-mechanism 28 or 31 must be brought into engagement with one of the wheels 26 or 30 by which it is to be actuated, i. e., the lever 1 must not be moved while the counter-mechanism 28 or 31 respectively is being brought into operation. For this purpose a wheel 11 (Figs. 2 and 3) is connected to the multiplicator lever in the following manner:—The toothed wheel 11 is loosely mounted upon the shaft 73 and is provided with a triangular recess 74 which is engaged by a pin 75 on the multiplicator lever (Figs. 7 and 8). In the initial position of the multiplicator lever (indicated at C in Fig. 3) the pin 75 contacts at one side of the recess 74 so that between it and the forward edge of this recess there is a clearance to the extent of which the multiplicator lever may be moved before actuating the toothed wheel 11. This clearance is so dimensioned that the multiplicator lever may be moved from the position C to the position indicated at O in Fig. 3 without actuating the toothed wheel 11.

The coupling of the counter-mechanism is effected during the movement of the multiplicator lever from C to O. For this purpose, a segment 76 is loosely mounted upon the shaft 73 and is frictionally connected therewith by means of a spring-pressed clutch member 77 fixed on said shaft, so that by rotation of the crank the segment is also rotated through the intermediary of this friction coupling 77 (Figs. 7 and 8). If now, for instance, the lever 62 of the forward counter-mechanism (Figs. 3, 5 and 9) is set for multiplication or addition by turning it on the shaft 63, a segment 78 fixed to the lever 62 causes a lever 80 on a pivot 79 to assume the dotted position shown in Fig. 9. This lever embraces the shaft 63 by means of an extended eye-portion 81 which is open at its upper end so that abutment faces 82 are formed against which abut corresponding faces of a segment 78 on the shaft 63 when the latter is turned toward the left or the right. The pin 79 forms the connection for the rod 83 which leads to the counter mechanism. As these counter mechanisms are at first resiliently locked the pins 79 are to be considered at first as stationary fulcrums inasmuch as upon rotation of the levers 62 upon the shafts 63 the levers 80 may be brought into the dotted line position, Fig. 9. The levers cannot be moved farther owing to the engagement of the left or right face of the extended eye 81 (according as the rotation of the lever 62 is toward the left or right) with the shaft 63, so that the lever 80 may be moved only within the space between the faces of the eye 81 and the surface of the shaft 63. This space corresponds exactly to the distance which the lever 62 must be moved in order to transfer it from its middle position into the multiplication or division position (indicated in Fig. 9 by M and D). If the lever 62 is thereupon rotated still farther into the position for adding, the segment 78 enters the space between the shaft 63 and the face of the eye 81.

The segment 76 which is frictionally coupled with the multiplicator lever is provided with projections 95 having beveled edges 84 and 85 so arranged that, when the lever 80 is in the dotted position, rotation of the multiplicator lever 12 will turn the segment 76 until the beveled edge 84 engages the pin 86 (dotted position). Upon further rotation of the multiplicator lever and the segment 76 the lever 80 will be turned around the shaft 63 by the engagement of the inclined edge 84 with the pin 86, thereby imparting a corresponding movement to the rod 83 which is connected with the counter mechanism, thus causing the counter mechanism to assume a position ready for engagement. When the machine is set for division or subtraction, the movement of the counter mechanism in the opposite direction is effected by means of the inclined edge 85.

In performing multiplications or divisions it is desirable that the counter mechanism after performing the calculation with one digit should advance to the extent of one digit. To this end the counter mechanisms are mounted for movement transversely of the machine and are controlled in such movement by a suitable escapement mechanism, as will be familiar to those skilled in the art. The pawl 87 (Fig. 3) of said escapement mechanism is actuated by an arm 88 of a double armed lever 90 pivoted on a pin 89 on the frame of the machine, which lever 90 is always brought into the same position by the action of a spring, while a roller on the arm 91 engages with a guide slot 92 (Figs. 8 and 11) within an arm 93 on the multiplicator lever 12. The roller 94 of the arm 91 is normally forced into the position shown in Fig. 3 by means of the spring acting upon the lever 90. On movement of the arm 93 in consequence of the rotation of the multiplicator lever in the direction of the arrow 96 (Fig. 11), the inclined edge 97 will come into contact with the roller 94 and press it inward so that the arm 90 is turned and the ratchet or feed gear is advanced one tooth, and the counter mechanism to the extent of one digit. As this setting of the counter mechanism can only take place when the lever 62 is in the multiplication or division position but not when in the position for adding or subtracting it is necessary to make provision for the locking of the lever 90 in the two latter cases, and this is effected by preventing the inclined edge 97 of this slot 92 from engaging the roller 94. This locking is effected as shown in Fig. 5 through the intermediary of the slide 65 which is provided for this purpose with the projection 98, which in the position for multiplication is adjacent the projection 99 of the lever 90. When, however, the lever 62 is brought into position for adding, indicated by A (Fig. 5) the slide 65 is advanced to such an extent that the lug 98 engages the projection 99 and thereby brings the lever 90 into such a position that the roller 94 engages the inner edge 100 of the slot 92. This roller serves also as a stop for the movement of the multiplicator lever which in the position for adding and multiplying is only to be moved up to the numeral one of the multiplication scale, inasmuch as the multiplicator lever can only be moved until its edge 101 or 102 respectively contacts with the roller 94.

In performing multiplications it is often desirable to correct a calculation already made without being obliged to cancel the first result obtained, by shifting the multiplication lever from the wrong numeral to the correct numeral. If, for instance, the multiplicator lever was set at the numeral 8 instead of the numeral 7 it is desirable that by a simple return movement of the multiplicator lever back to numeral 7 the correct result should be produced in the counter mechanism. This can only be done by making provision to insure that by the return movement of the multiplicator lever the counter mechanisms are not at once released but shall be kept in engagement and thus moved back the proper amount. For this purpose, the segment 76 which is coupled to the multiplicator lever by friction must not be actuated on the free return movement of the multiplicator lever and its pin 75 engaging the slot 74 in the gear 11. For this purpose a rod 103 is slidably arranged within a slot of the multiplicator lever (Figs. 3 and 8) which rod may be raised by a pawl 105 pivoted on a pin 104. At the lower end of this rod is a pin 106 which engages a slot 107 of an arm 109 on a pivot 108. An arm 110 is keyed to the pivot 108 of the arm 109 (Figs. 7 and 12) the forward end of the arm 110 engaging with a recess 111 of the boss of the segment 76. If the pin 106 is lifted by raising the pawl 105, thereby imparting a turning movement to the arm 109, the arm 110 will be turned to a corresponding extent, that is: the segment 76 will also be turned through an angle, but on return movement of the multiplicator lever the segment 76 remains in its engaged position in which the pin 86 of the lever 80 abuts against the inclined edge 84 or 85, i. e., the counter mechanisms remain in engagement. It may also be desirable to shift the multiplicator lever 12 from one position, for instance the position corresponding to the numeral 5, to another position, for instance that corresponding to the numeral 7, without transmitting this movement to the counter mechanism (as for instance in the case of division). To this end the segment 76, by means of which the counter mechanism is coupled with the gear wheels is adapted to be disengaged, so that the counter mechanisms will assume their inoperative position.

In conjunction with the pawl 105 there is arranged a detent 113 by means of which the rod 103 which is guided in the multiplicator lever 12, can be forced downward so that the arm 109 and therefore the arm 110 will be turned in the opposite direction.

Having described my invention what I claim and desire to secure by Letters Patent of the United States is:—

1. A calculating machine comprising in combination with a frame, counter mechanism, levers operating said counter mechanism and a multiplicator lever, gearing operated by said multiplicator lever, toothed racks connected with the forward ends of said levers and actuated by said gearing, toothed racks connected to the rear ends of said levers and operating the counter mechanism a plurality of openings in said levers, a plurality of pins corresponding in position to these openings, a key corresponding to and connected with each of these pins, each key being adapted on depression to move its pin into the corresponding opening in the lever, as and for the purpose set forth.

2. A calculating machine comprising in combination with a frame counter mechanism levers operating said counter mechanism and a multiplicator lever, gearing operated by said multiplicator lever toothed racks connected with the forward ends of said levers and actuated by said gearing, toothed racks connected to the rear ends of said levers and operating the counter mechanism, a plurality of openings in said levers, a plurality of pins corresponding in position to these openings, a key corresponding to and connected with each of these pins, each key being adapted on depression to move its pin into the corresponding opening in the lever, recessed portions in the counter mechanism actuating racks, locking pins movably arranged in the path of said racks, zero keys and lugs formed thereon, said lugs adapted to move said locking pins into said openings, as and for the purpose set forth.

3. A calculating machine comprising in combination with a frame counter mechanism levers operating said counter mechanism and a multiplicator lever, gearing operated by said multiplicator lever toothed racks connected with the forward ends of said levers and operated by said gearing, toothed racks connected to the rear ends of said levers and operating the counter mechanism, a plurality of openings in said levers, a plurality of pins corresponding in position to these openings, a key corresponding to and connected with each of these pins, each key being adapted on depression to move its pin into the corresponding opening in the lever, recessed portions in the counter mechanism actuating racks, locking pins movably arranged in the path of said racks, zero keys and lugs formed thereon, said lugs adapted to move said locking pins into said openings, and means permitting the depression of a key in the initial position of the multiplicator lever, as and for the purpose set forth.

4. A calculating machine comprising in combination with a frame counter mechanism levers operating said counter mechanism and a multiplicator lever, gearing operated by said multiplicator lever toothed racks connected to said gearing operated by said toothed racks connected with the forward ends of said levers and operated by said gearing, toothed racks connected to the rear ends of said levers and operating the counter mechanism a plurality of openings in said levers, a plurality of pins corresponding in position to these openings, a key corresponding to each of these pins, each key being adapted on depression to move its pin into the opening in the lever recessed portions in the counter mechanism actuating racks, locking pins movably arranged in the path of said racks, zero keys and lugs formed thereon, said lugs adapted to move said locking pins into said openings, means permitting the depression of a key in the initial position of the multiplicator lever, means actuating the multiplicator lever for bringing the counter mechanism into gear, and means permitting relative movement of the said lever and said actuating means, as and for the purpose set forth.

In testimony whereof I have signed my name to this specification in the presence of two subscribing witnesses.

ROBERT REIN.

Witnesses:
HENRY HASPER,
WOLDEMAR HAUPT.